July 26, 1932.  D. E. GRAY ET AL  1,869,249
MOLD ATTACHING DEVICE FOR GLASS WORKING MACHINES
Filed June 30, 1930  2 Sheets-Sheet 1

INVENTORS
David E. Gray, &
BY Donald W. Strait.

ATTORNEY

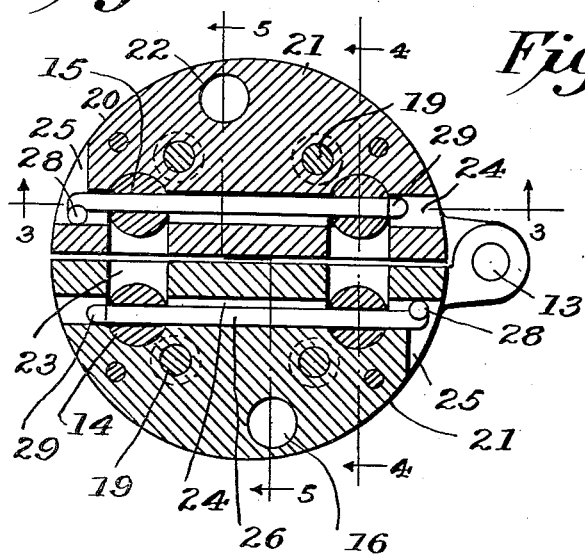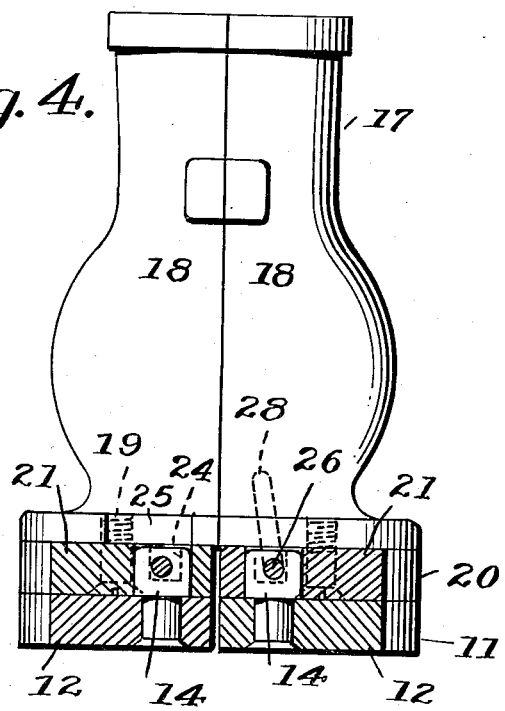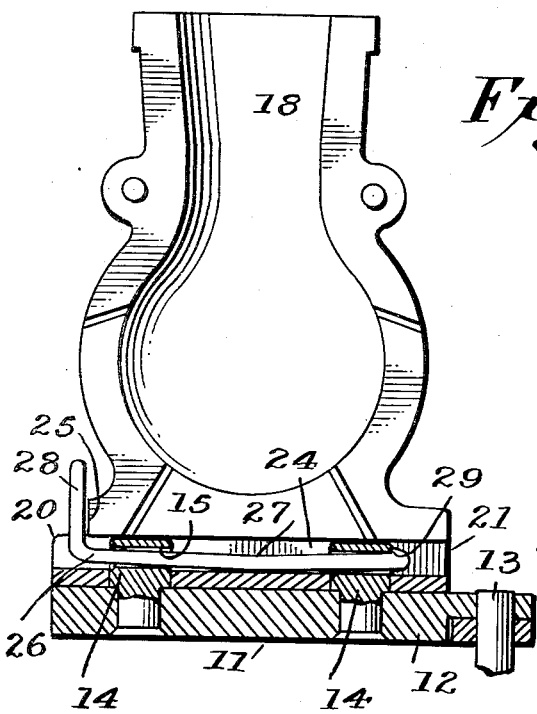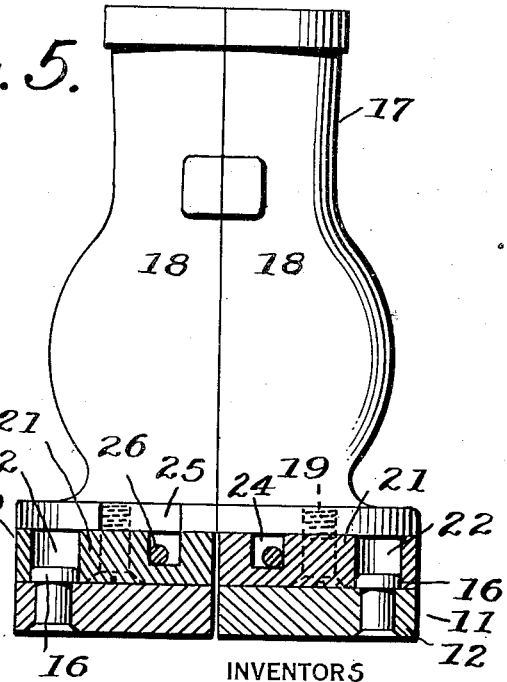

Patented July 26, 1932

1,869,249

UNITED STATES PATENT OFFICE

DAVID E. GRAY AND DONALD W. STRAIT, OF CORNING, NEW YORK, ASSIGNORS TO CORNING GLASS WORKS, OF CORNING, NEW YORK, A CORPORATION OF NEW YORK

MOLD ATTACHING DEVICE FOR GLASS WORKING MACHINES

Application filed June 30, 1930. Serial No. 464,980.

This invention relates to mold attaching devices for glass working machines and has for its object to facilitate the rapid attaching of molds to and detaching from a mold carrier.

Another object is to rigidly hold the mold to the carrier in such a manner that it can not become accidentally loosened through vibration or otherwise.

A further object is to simplify the construction of mold attaching devices and eliminate the necessity of employing threaded devices such as screws and bolts for securing the molds to their carriers.

The above and other objects may be accomplished by employing our invention which embodies among its features a mold attaching plate which is provided with upstanding apertured studs which are received in slots formed in the under side of the bottom of the mold, and a resilient key member which is introduced through an opening extending through the mold bottom and through the apertures in the studs to firmly anchor the mold to the mold attaching plate.

In the drawings:

Fig. 2 is a horizontal sectional view through the mold bottom showing in detail the mold locking devices;

Fig. 3 is a transverse sectional view taken on the line 3—3 of Fig. 2;

Fig. 4 is a transverse sectional view taken on the line 4—4 of Fig. 2;

Fig. 5 is a transverse sectional view taken on the line 5—5 of Fig. 2.

Figure 1:
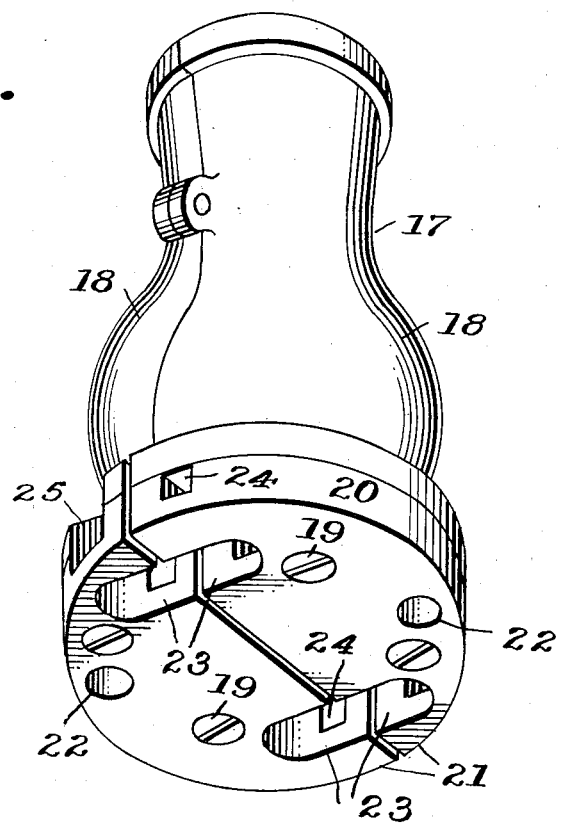
Fig. 1 is a perspective view of a fragment of a mold carrier showing the mold attaching plate in position thereon and illustrating the mold separated therefrom.
Figure 1:
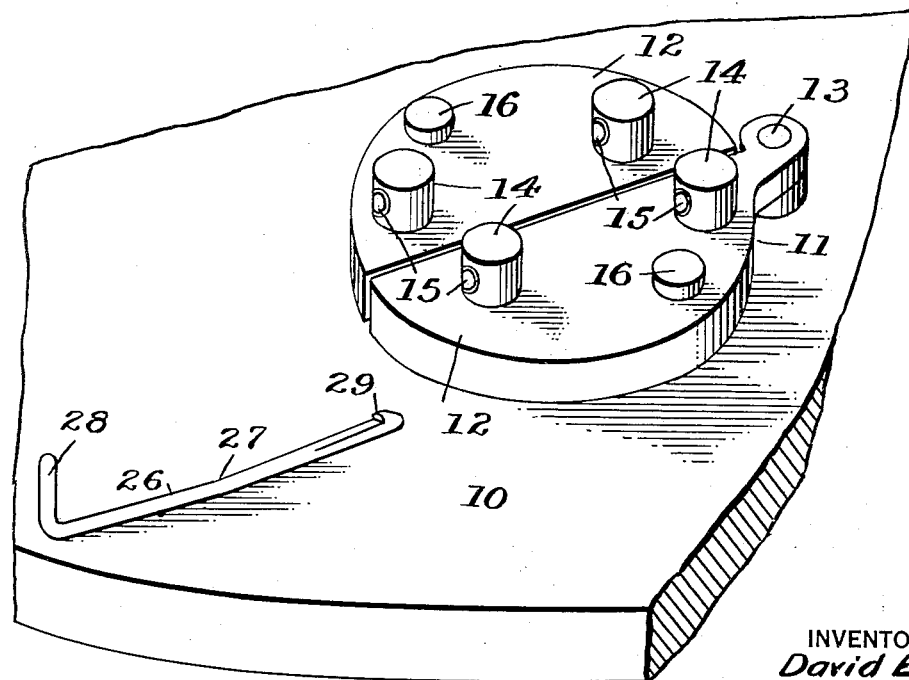

Referring to the drawings in detail, a mold carrier 10 which may be in the form of a rotating table is provided at spaced intervals with mold attaching plates 11 each of which is composed of two semi-circular segments 12 which may be hinged together as at 13 or arranged to separate in any approved manner that is well known in the art. Each semi-circular segment 12 is provided adjacent its straight side with a pair of upstanding studs 14 which are spaced from each other as shown and formed with aligning key receiving openings 15. A mold locating stud 16 is carried by each semi-circular segment and cooperates with the studs 14 in stabilizing the molds when the latter are in position on the plates 11.

Each mold 17 which in the present illustration is shown as consisting of a pair of mold halves 18 has secured to its lower end by means of screws 19 a bottom plate 20. In the present structure, owing to the fact that an open and shut mold is illustrated, the bottom plate 20 is composed of a pair of semi-circular segments 21 each of which is apertured as at 22 to receive the studs 16 hereinbefore mentioned. Formed in the mating edges of the segments 21 are notches 23 for receiving the studs 14 when the mold 17 is in place on its respective attaching plate 11. Formed in the upper side of each semi-circular segment 21 and extending parallel to its straight edge is a groove 24 which aligns with the openings 15 in the studs 14 and cooperates with these openings in receiving the mold locking key to be more fully hereinafter described. As shown the upper side of each groove 24 is closed by the bottom of its respective mold half 18 so as to form in effect a rectangular opening which extends across the entire width of the mold bottom. As shown in Fig. 2, the bottom flange of each mold half 18 and its respective semi-circular segment 21 is cut away as at 25 to accommodate the end of the mold attaching key above referred to.

The molds after being positioned on the mold attaching plates are locked in position by thrusting a key 26 into the slot 24 and through the openings 15 in the studs 14. Locking of the key is accomplished by rotating it on its longitudinal axis so as to move its bowed portion 27 into contact with the bottom wall of its respective groove 24 and slightly beyond the dead center toward the side wall furthest from the straight edge of the segment as shown in Figs. 2, 3 and 5. Further movement of the key is restricted by the engagement of its bent end 28 against the end wall of the notch 25. This places the key under tension causing the shoulder 29, formed near the end of the key opposite its bent end 28, to engage against the edge of one of the studs 14 and lock the key against longitudinal movement. Moreover, by moving the bowed portion of the key beyond the dead center as described it is effectively locked against accidental displacement and cannot be released without exerting sufficient rotating effort to overcome the tension of the key.

While in the foregoing we have shown and described this invention as applicable to an open and shut mold, it is obvious that the same is equally applicable to a solid mold and that minor changes in the details of construction, combination and arrangement of parts may be resorted to without departing from the spirit and scope of the invention as claimed.

What is claimed is:

1. In a glass working machine, in combination with a mold having recesses in its bottom, a mold carrier, studs carried by the carrier and cooperating with the walls of the recesses in locating and holding the mold on the carrier, means engaging the studs and the mold bottom for locking the mold to the carrier and means on the locking means for preventing its accidental removal.

2. In a glass working machine, in combination with a mold having recesses in its bottom, a mold carrier, studs carried by the carrier and cooperating with the walls of the recesses in locating and holding the mold on the carrier, a key engaging the studs and the mold bottom for locking the mold to the carrier and means on the key for preventing its accidental removal.

3. In a glass working machine, in combination with a mold having recesses in its bottom and a transverse opening intersecting the recesses, a mold carrier, apertured studs carried by the mold carrier and cooperating with the walls of the recesses in locating and holding the mold on the carrier, a resilient key adapted to be thrust through the transverse opening and the apertures in the studs to lock the mold to the carrier and means on the key for preventing its accidental removal.

4. In a glass working machine, in combination with a mold having recesses in its bottom and a transverse opening intersecting certain of the recesses, a mold carrier, a mold attaching plate carried thereby, upstanding apertured studs carried by said plate, said studs being adapted to enter the recesses to hold the mold on the attaching plate, a resilient bowed key adapted to be thrust through the transverse opening in the mold bottom and the apertures in the studs and means on the key for preventing its accidental removal.

DAVID E. GRAY.
DONALD W. STRAIT.